March 12, 1929. D. F. FESLER 1,705,285
LUBRICANT COMPRESSOR
Filed Jan. 10, 1924
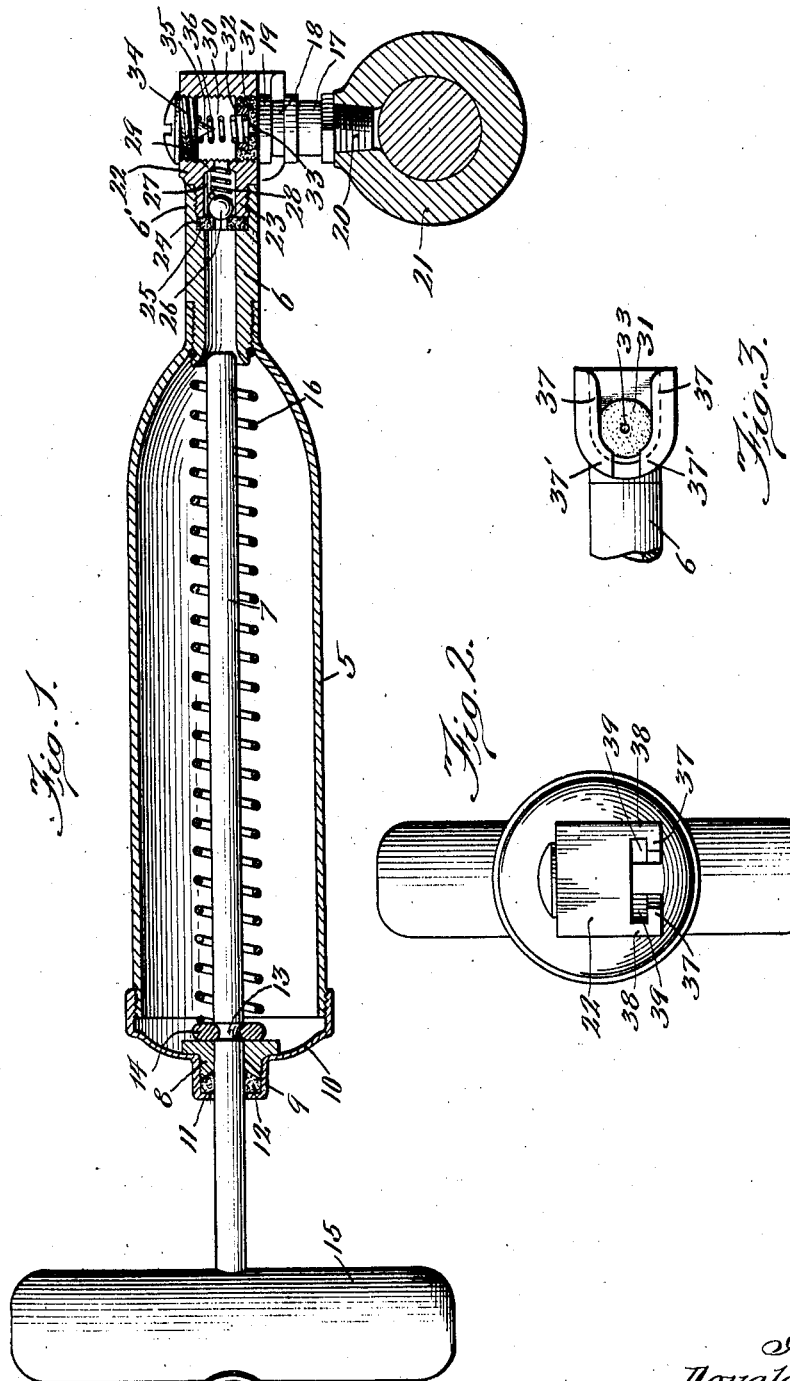

Patented Mar. 12, 1929.

1,705,285

UNITED STATES PATENT OFFICE.

DOUGLAS F. FESLER, OF CHICAGO, ILLINOIS, ASSIGNOR TO ALEMITE MANUFACTURING CORPORATION, OF CHICAGO, ILLINOIS, A CORPORATION OF DELAWARE.

LUBRICANT COMPRESSOR.

Application filed January 10, 1924. Serial No. 685,358.

My invention relates to improvements in lubricant compressors and is particularly concerned with improvements in compressors designed to form a part of a lubricating system comprising a plurality of fittings, one of which is secured to each of the bearings to be lubricated and a compressor for supplying lubricant under pressure to the fittings, the compressor including means for successively making sealed connections with the various fittings.

The objects of my present invention are

First, to provide a compressor of the character set forth, comprising means by which the sealed connection with a fitting and the forcing of the lubricant into the fitting can be accomplished by a single movement or operation on the part of the operator.

Second, to provide a compressor of the character described in which the direction of discharge of the lubricant from the compressor is at an angle to a direction in which the compressor is moved to make connection with the fitting.

Third, to provide a compressor such as described which is particularly adapted for supplying fluid lubricants to fittings, and Fourth, to provide a compressor of the character described which is simple in construction, economical to manufacture and easy to operate.

Other objects of my invention will appear as this description progresses, reference being had to the accompanying drawings in which Figure 1 is a central longitudinal section through a compressor embodying my invention, the compressor being illustrated as attached to a fitting which is shown in side elevation.

Figure 2 is an end view of my improved compressor, and

Figure 3 is a bottom view of the coupling member.

Throughout the several views similar reference characters will be used for referring to similar parts.

The embodiment of my invention disclosed herein comprises a cylindrical barrel 5 having a rigid discharge conduit 6 at one end thereof. This discharge conduit forms a cylinder for receiving and co-acting with the inner end of a plunger rod 7. This plunger rod is reciprocably mounted in a gland 8 which is threaded into the hollow boss 9 which is stamped from the detachable cap 10. The boss 9 is provided with an inturned flange 11 between which and the inner end of the gland 8 the gasket 12 is confined.

The plunger rod has a groove 13 formed therein adjacent to its outer end for receiving the split ring 14 which co-acts with the inner end of the gland 8 to limit the outward movement of the plunger rod. The outer end of the plunger rod is provided with a suitable handle 15. A compression spring 16 confined between the ring 14 and the end of the discharge conduit 6 provides means for yieldingly holding the plunger rod in its outermost position.

The fitting which I prefer to use with the compressor described herein comprises, as shown in Figure 1, a hollow cylindrical member 17 having an annular groove 18 cut therein to form an annular rib 19. The other end of the fitting is threaded, as shown at 20, to provide a means for securing it to a bearing 21 to be lubricated.

The coupling member which I prefer to use for effecting sealed connection between the compressor and the fitting comprises the body member 22 which is provided at one end with a threaded boss 23 which is received by the internally threaded end 6' of the discharge conduit. A perforated disc 24 is clamped between the end of the boss 23 and a shoulder 25 formed in the discharge conduit 6 and acts as a seat for the ball valve 26. This valve is confined in the bore 27 formed in the boss 23 and is yieldingly held on its seat by means of the compression spring 28 confined between the ball closure and the shoulder 29.

The body member is provided with a larger bore 30 which extends entirely through the body member and at right angles to the bore 27. The bore 30 is threaded throughout its length to receive the cup leather 31 which is held in place by means of the externally threaded collar 32 and which is provided in its bottom with an opening 33 through which the lubricant is discharged. The opposite end of the bore 30 is closed by means of the screw threaded plug 34 and the inner end of which is provided with a conically shaped projection 35 which centers one end of the compression spring 36. The opposite end of this spring extends from the collar 32 and presses upon the bottom of the cup leather 31.

A pair of flanges 37 are secured to the body member 22 in spaced relation to each other and to said body member by the integrally formed extensions 38. These flanges are adapted to be received by the groove 18 of the fitting and provide two grooves 39 for receiving the opposite sides of the annular rib 19 of the fitting. The opening between the two flanges 37 opens in a direction away from the barrel 5 of the compressor so that in making connection between the compressor and a fitting the coupling member must be moved in a direction extending in substantially right angles to the axis of the compressor barrel 5 and the lubricant is discharged into the fitting in a direction extending at right angles to the direction of the force which is exerted upon the compressor to connect it with the fitting and to discharge the lubricant under pressure from the compressor.

In the operation of my improved compressor the barrel is first filled with lubricant, it being understood that for this purpose the cap 10 is first detached and the plunger rod 7 removed. After the barrel has been filled the plunger rod 7 and the cap are replaced, whereupon the spring 16 tends to hold the plunger rod in the position shown in Figure 1. The operator then grasps either the barrel 5 or the handle 15 and brings the coupling member in the proper position relative to the fitting to enable a connection to be made with the fitting by moving the coupling member in a direction parallel with the axis of the barrel. When the connection with the fitting has been established, which is evidenced by the contact of the fitting with the curved portions 37' of the flange 37, the operator simply continues to push upon the handle 15 whereby the plunger 7 will be caused to enter the bore of the discharge conduit 6 and displace the lubricant therefrom, thus forcing it out through the bore 30, the opening in the cup leather and into the fitting. When the pressure upon the handle 15 is released the spring 16 will return the plunger bar to its outermost position and at the same time create a vacuum in the bore of the discharge conduit 6 which will cause the lubricant to be sucked into this bore as soon as the inner end of the plunger rod clears the inner end of the bore in the discharge conduit 6. If the operator then repeats the inward thrust upon the handle 15 another charge of lubricant will be forced into the fitting. In this description it will be apparent that as long as the operator continues to reciprocate the plunger rod lubricant will be forced into the fitting. When sufficient lubricant has been supplied to the fitting the operator merely pulls upon the handle 15 sufficiently to disengage the coupling member from the fitting and then proceeds to the next fitting.

While I have described the details of construction of the preferred embodiment of my invention it is to be clearly understood that my invention is not limited to these details but is capable of other adaptations and modifications within the scope of the appended claims.

Having described my invention, what I claim is—

1. A lubricant compressor comprising a barrel having a centrally apertured cap and a rigid discharge conduit at the other end forming a cylinder, a coupling member secured to the outer end of said discharge conduit said coupling member comprising a body member having two substantially parallel flanges secured thereto in spaced relation to each other and to said body member, a space between said flanges opening in a direction away from said barrel, and a spring and lubricant pressed sealing washer in said member, a plunger extending through said cap the inner end of said plunger being reciprocable in said discharge conduit and a spring for urging said plunger away from said discharge conduit.

2. A lubricant compressor comprising a barrel having a rigid discharge conduit forming a cylinder, a check valve in said conduit, a coupling member rigidly secured to the outer end of said discharge conduit, said coupling member comprising means extending at an angle to the axis of said barrel for making connection with a fitting by a movement of said coupling member in a direction parallel with the axis of said barrel, a spring and lubricant pressed sealing washer in said member, and a plunger reciprocably mounted in said barrel, the inner end of said plunger co-acting with said cylinder to force lubricant from said compressor through said coupling member into a fitting, upon movement of the plunger in the direction of the coupling operation.

3. A compressor comprising a barrel, a cylinder secured to and communicating with said barrel, a plunger reciprocable in said cylinder and extending through said barrel and a coupling member rigidly secured to the outer end of said cylinder, the said coupling member comprising means for discharging the lubricant in a direction at an angle to the axis of said barrel, a spring pressed sealing washer, and also comprising means for making connection with a fitting by means of a movement in a direction parallel with the axis of said barrel, in the sense of the operative stroke of said plunger.

4. A lubricant compressor comprising a cylinder, means for supplying lubricant to said cylinder, a plunger reciprocable in said cylinder, a handle for said plunger, and a coupling member rigid with said cylinder and having means at one side thereof for making a connection with a fitting, said connection being made in the direction of the operative stroke of said plunger.

5. A lubricant compressor comprising a barrel, a cylinder communicating with said barrel, a coupling member communicating with and rigid with said cylinder and having means at its side for making a detachable connection with a fitting, a sealing member in said coupling subjected to the pressure of the lubricant, common means for placing the lubricant in said cylinder under pressure and for exerting pressure upon the coupling member in a direction toward the fitting, and a mechanical connection between said cylinder and coupling member preventing said pressure from tipping said coupling member with respect to said fitting.

In witness whereof, I hereunto subscribe my name this 31st day of December, 1923.

DOUGLAS F. FESLER.